(12) United States Patent
Kraemer et al.

(10) Patent No.: US 6,623,009 B1
(45) Date of Patent: Sep. 23, 2003

(54) WORD-PHRASE CARD GAME

(76) Inventors: Clement L. Kraemer, 12881 Wheeler Pl., Santa Ana, CA (US) 92705; Janet A. Kraemer, 12881 Wheeler Pl., Santa Ana, CA (US) 92705

(*) Notice: Subject to any disclaimer, the term of this patent is extended or adjusted under 35 U.S.C. 154(b) by 0 days.

(21) Appl. No.: 10/127,114

(22) Filed: Apr. 22, 2002

(51) Int. Cl.[7] .............................. A63F 3/00; A63F 1/00; G09B 19/22

(52) U.S. Cl. .................... 273/272; 273/299; 434/167

(58) Field of Search ................................ 434/167, 172, 434/173, 174; 273/299, 300, 302, 272

(56) References Cited

U.S. PATENT DOCUMENTS

| | | | |
|---|---|---|---|
| 2,783,998 A | | 3/1957 | Collins |
| 3,640,531 A | * | 2/1972 | Penders ........................ 273/459 |
| 4,171,816 A | | 10/1979 | Hunt |
| 4,333,656 A | | 6/1982 | Sommer |
| 4,470,821 A | * | 9/1984 | LeCapelain .................. 434/172 |
| 4,671,516 A | * | 6/1987 | Lizzola et al. ............... 273/299 |
| 4,923,199 A | | 5/1990 | Hahn |
| 5,014,996 A | * | 5/1991 | von Braunhut ............. 273/299 |
| 5,018,728 A | * | 5/1991 | Liss ............................. 273/459 |
| 5,145,183 A | | 9/1992 | Gates |
| 5,441,277 A | * | 8/1995 | Lenhart et al. .............. 273/249 |
| 6,168,439 B1 | * | 1/2001 | Anderson .................... 434/167 |
| 6,234,486 B1 | * | 5/2001 | Wallice ....................... 272/299 |

FOREIGN PATENT DOCUMENTS

| | | | | |
|---|---|---|---|---|
| WO | WO 96/24415 | * | 8/1996 | ............ A63F/1/04 |
| WO | WO 97/25115 | * | 7/1997 | ............ A63F/3/00 |

* cited by examiner

Primary Examiner—Derris H. Banks
Assistant Examiner—Kurt Fernstrom
(74) Attorney, Agent, or Firm—Mark Pellegrini

(57) ABSTRACT

A word-phrase forming game for entertaining and promoting interaction among players. The word-phrase game educates players in the areas of grammar, language, and communication, by developing concepts of syntax or word relationships, pronunciation, vocabulary, spelling, reading comprehension, and writing skill. The game utilizes a deck of cards having multiple letters of the alphabet selected and imprinted on them in a random fashion. Players are required use each letter to form individual words that when read together in the order given forms a grammatically correct coherent word-phrase. Players are awarded points for the total number of syllables contained in the word-phrase.

17 Claims, 3 Drawing Sheets

12

| SYL-LA-BLES ||
|---|---|
| PLAYER 1 | PLAYER 2 |
| | |
| TOTAL | TOTAL |

FIG. 3

WORD-PHRASE CARD GAME

FEDERALLY SPONSORED RESEARCH

Not Applicable

SEQUENCE LISTING OR PROGRAM

Not Applicable

BACKGROUND OF THE INVENTION

1. Field of the Invention

The present invention relates to word games and, in particular, to a word-phrase game that utilizes a deck of cards for entertaining and promoting interaction among players. In addition, the present invention educates players in the areas of grammar, language, and communication, by developing concepts of syntax or word relationships, pronunciation, vocabulary, spelling, reading comprehension, and writing skill.

2. Description of the Prior Developments

Games in which the players compete to form words from letter elements drawn by or dealt to them are both educational and entertaining. Typically, these types of games utilize tiles or cards and can be categorized into three main groups.

The first type of game requires the player to recombine a set number of letters dealt to them into as many separate and distinct words as they can create. Points are based on the length of the word and the number of distinct words created. Hahn, U.S. Pat. No. 4,923,199 is an example of this type of game. A variation of this type of game, using single and double letter cards, is disclosed in Collins U.S. Pat. No. 2,783,998.

In a second type of game, players combine lettered tiles or decks into a word with point values for the word based on the frequency with which each letter borne in the word occurs in the English language. Hence, more points are awarded for a word using letters that are infrequently used in the English language, i.e., the letters Z or Q. Sommer, U.S. Pat. No. 4,333,656 typifies this type of game.

A third type of game requires players to form a word relating to some specific area of grammar. Players are awarded points based on their abilities to match word types to grammar or language category or form word and/or word variations within a grammar category. For example, Hunt U.S. Pat. No. 4,171,816 discloses a word game in which players match an example of a grammar or language category with a grammar or language category selected by chance and accumulate grammar matches to gain points. Gates, U.S. Pat. No. 5,145,183 and Anderson, U.S. Pat. No. 6,168,439 are games directed toward the grammar category of syllables. Gates, discloses a word game in which players are given points based on the number of syllables formed in a word created using a finite set of letters in a given baseword. Anderson, discloses a word game in which players create a word from a single lettered tile then increase the number of syllables in the same word previously created by adding various suffixes to the word.

While these word games fulfill their respective objectives and requirements they do not educate players, within one game, in the areas of grammar, language, and communication by developing concepts of syntax or word relationships, pronunciation, vocabulary, spelling, reading comprehension, and writing skills. The existing word games' educational value is limited because the games do not require players to establish word-phrase relationships. This obvious limitation is shown, in existing word games, by having players create or develop words in isolation from other words. By restricting structural configuration to single word formation the players' ability to master the natural working relationships between noun, verb, adjective, and adverb is stymied. Furthermore, spelling, reading comprehension, and writing skill development are impeded due to the lack of practice in creating and using word-phrase relationships. The present invention overcomes these limitations inherent in the existing word game field.

The present invention comprises a card game utilizing a deck of cards, timer, score pad, and writing instrument. Each card in the deck is randomly marked with letters, preferably four, of the English alphabet. The object of the game, hereafter known as SYL-LA-BLES, is for players to a create a word-phrase using a playing card bearing randomly selected and ordered indicia letters of the alphabet as the beginning letter in four separate words that create a coherent phrase when recited together in the same order the letters appear on the card. Players are awarded points based on the number of syllables contained in the word-phrase. Therefore, by creating individual words with more syllables the player will naturally create phrases with more syllables when these words are combined into a coherent sequence.

The game SYL-LA-BLES is a superior grammar and language-learning tool in that it requires the players to form word-phrase relationships. SYL-LA-BLES, in requiring players to form a word-phrase, educates players' in the areas of grammar, language, and communication in a number of ways including: (1) the players' ability to master the syntax or word relationships between noun, verb, adjective, and adverb as players structure the words to form a grammatically correct word-phrase; (2) the players' ability to spell words improve as they sound out the word-phrase phonetically in order to determine the number syllables in each word-phrase; (3) pronunciation skills increase as players sound out words, use stress for word accents, and then verbally communicate the word-phrase they formed to the opposing player; (4) vocabulary, reading comprehension, and writing ability naturally improve in conjunction with the syntax skills, and finally, (5) the players' creativity and self-expression are unleashed as word-phrase creation can encompass virtually unlimited word diversity.

In view of the foregoing disadvantages inherent in the existing types of word games, the present invention provides a new word game construction wherein the game can be utilized for entertaining players and improving a multitude of grammar, language and communication skills.

OBJECTS AND ADVANTAGES

It is a general object of the present invention to provide an educational and entertaining game apparatus dealing with grammar, language, and communication.

Another object of the invention is a simple apparatus for promoting peer group as well as parental/child interaction during the learning of language concepts in an atmosphere that is stimulating, interesting, and challenging.

It is another object of the invention to promote the concepts of syntax or word relationships, pronunciation, vocabulary, spelling, reading comprehension, and writing skill.

Still another object of the invention is to improve the player's ability to establish syntax or word relationships by forming word-phrases that naturally use noun, verb, adjective, and adverb association.

It is an object of the present invention to provide a deck of cards which when played permits players to be awarded points corresponding to the number of syllables contained in the word-phrase they create.

It is another object of the present invention to provide a card game that improves word pronunciation as players sound out and verbally communicate the word-phrase they formed to the opposing player.

It is a further object of the invention to improve player spelling by requiring players to sound out the word-phrase phonetically in order to determine the number of syllables in each word-phrase.

It is another object of the invention to improve reading comprehension as players utilize the learned game skill of sounding out word syllables phonetically when encountering unfamiliar words in their pleasure reading.

Another object of the invention is to stimulate the player's creativity in forming words by allowing the player to create any word from only a single letter and then combining the words into coherent speech patterns.

SUMMARY OF THE INVENTION

The present invention comprises a card game utilizing a deck of cards bearing randomly selected and ordered indicia letters of the alphabet, timer, and score pad. The word game, SYL-LA-BLES, entertains and promotes interaction among players. Additionally, the present invention educates players in the areas of grammar, language, and communication by developing concepts of syntax or word relationships, pronunciation, vocabulary, spelling, reading comprehension, and writing skill. SYL-LA-BLES accomplishes these objectives and advantages by requiring players to form multiple syllable words that must be assimilated into a grammatically correct and coherent word-phrase. A point value for the word-phrase is based on the total number of syllables in the word-phrase. Creating a word-phrase increases the players' ability to master the syntax or word relationships between noun, verb, adjective, and adverb. Mastery of language syntax aids in increasing reading comprehension and writing skill as players' recognize familiar word-phrase patterns in their pleasure reading and writing. Additionally, as players carefully sound out the word syllables phonetically the players' word pronunciation improves. Finally, the opportunity for group or parent/child interaction created by the game's interesting, stimulating, and entertaining play cannot be overlooked as a vehicle for building quality relationships.

BRIEF DESCRIPTION OF THE DRAWINGS

FIG. 3 illustrates a type of pad used for scoring the number of syllables contained in each word-phrase.

DESCRIPTION OF THE PREFERRED EMBODIMENT

Figure 1:
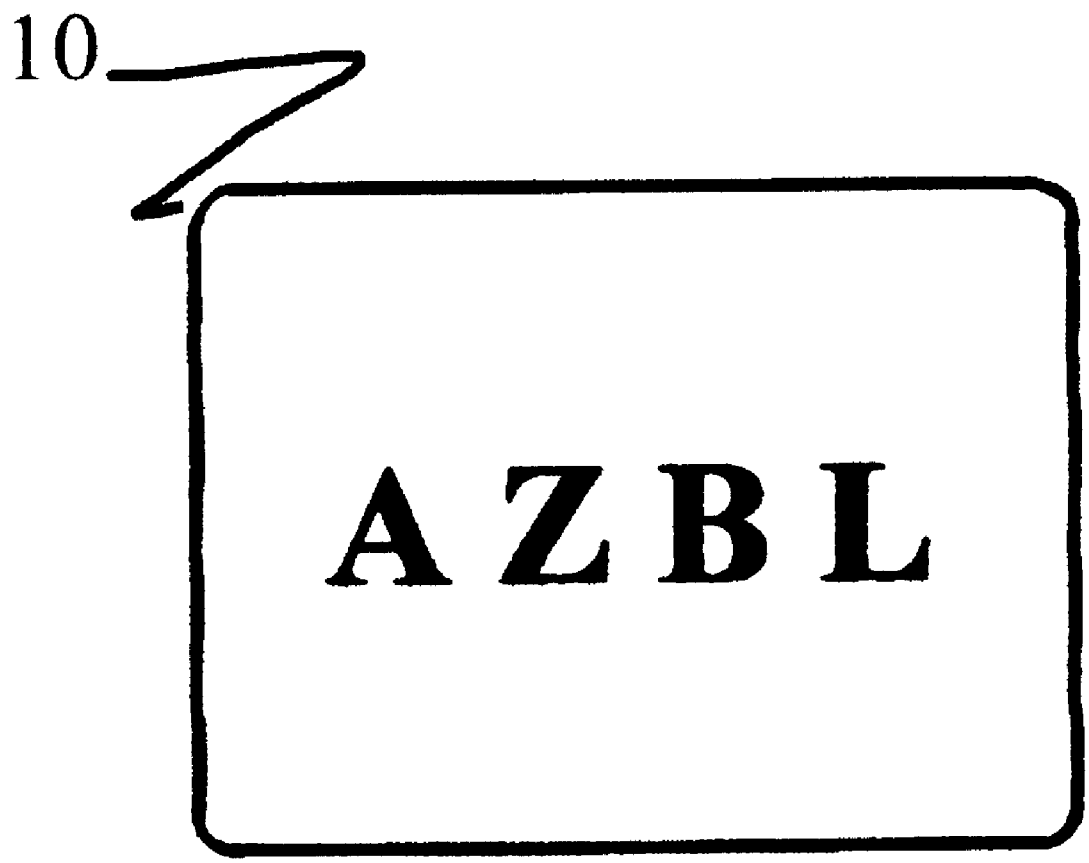
FIG. 1 illustrates an example of a typical letter card used in the present invention.
Figure 2:
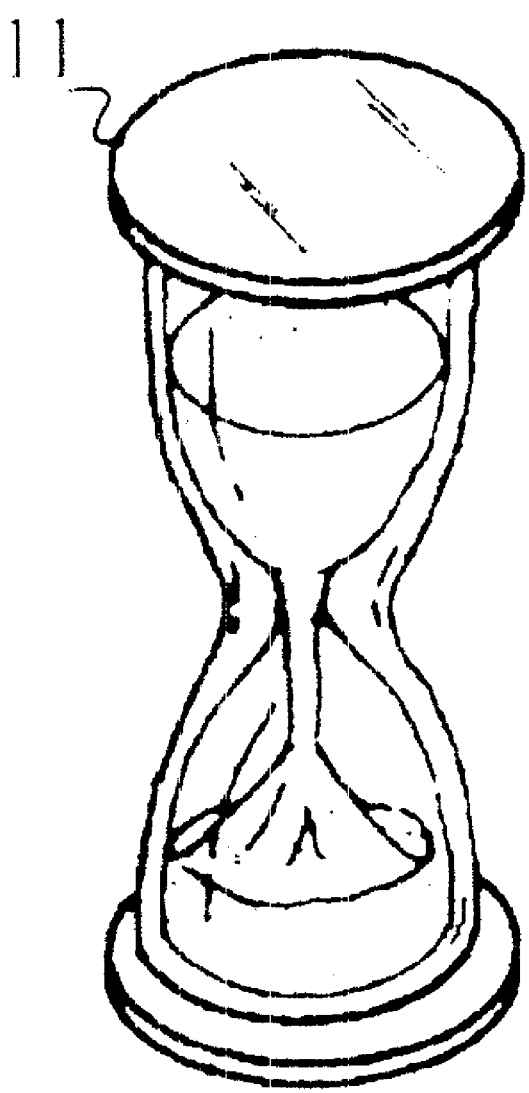
FIG. 2 shows one type of timer that may be used in the present invention.
Figure 3:
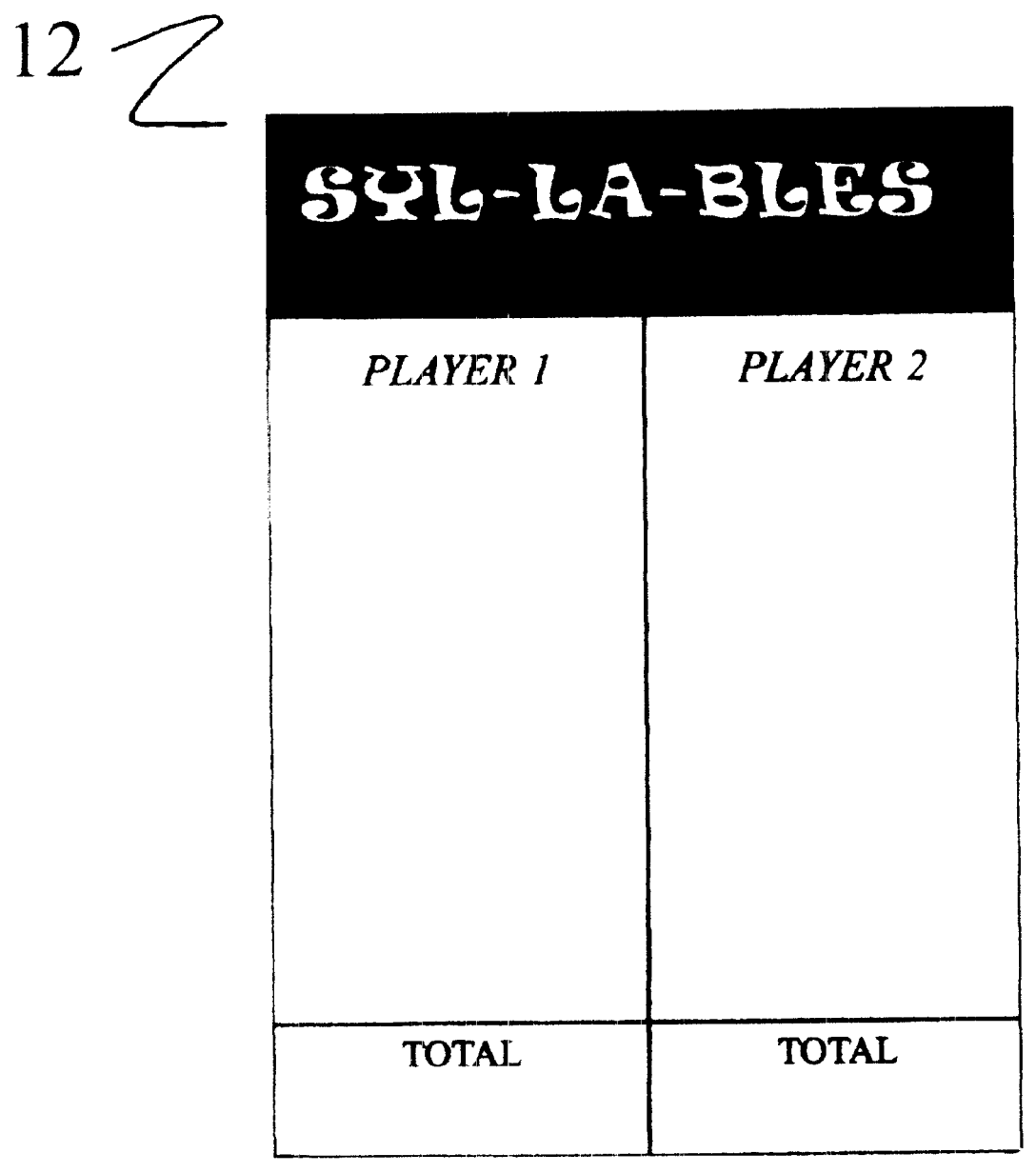

Referring to FIGS. 1 through 3, the present invention is a card game with a deck of fifty-seven cards. Each card 10 bears four indicia letters of the alphabet randomly selected and ordered. Included in the fifty-seven-card deck are five vowel cards bearing four identical vowel letters. These vowel cards are designated bonus cards for scoring purposes. A timer 11 is provided. The timer expires after a predetermined time, preferably one minute, has elapsed. Additionally, a designated player is provided with a score pad 12. Although the preferred embodiment of the game envisions the use of a timer 11 and score pad 12 the spirit, enjoyment, and educational value of the present invention will still be realized without use of these additional implements.

Each round of game play is commenced after a first dealer is chosen and the deck of cards 10 is shuffled. A card 10 is provided for each player from the first dealer. After each player receives a card 10, the timer 11 is started, and all players begin to a create a word-phrase using the card 10 bearing randomly selected and ordered indicia letters of the alphabet as the beginning letter in four separate words that create a coherent phrase when recited together in the same order as the letters appear on the card 10. Players stop creating their word-phrase when time has expired for the round. Players verbally communicate their word-phrase aloud to the other players. Players are awarded points based on the number of syllables contained in the word-phrase. For example, a player receiving a card 10 bearing the indicia letters A Z B L might form the phase, "Aren't zebras beautiful looking?" The player would then be awarded eight points for this word-phrase. Therefore, by creating words with more syllables the player will naturally create phrases with more syllables when these words are combined into a coherent word-phrase sequence.

Any group of words including: noun, verb, adjective, adverb, etc. are acceptable. The combined words must form a complete grammatically correct and coherent word-phrase sequence. Additionally, the words forming the word-phrase must be found in a Standard English dictionary. Proper nouns such as Johnson, and Arizona are not allowed in the word-phrase. Simple words such as and, or, a, the, it, is etc., cannot be added between words to form a complete phase if the beginning letter of the simple word is not found in the indicia letters. For example, using the indicia letters A Z B L to form the phrase "A zebra is beautiful looking" contains the word [is], beginning with the letter [i] not found in the indicia letters A Z B L. Therefore, the word [is] is prohibited in this word-phrase example.

Players have the opportunity to be awarded additional points during each round by challenging the syllable composition of the word-phrase created by the other players. The challenging player will be awarded points only for recognizing missed syllable points of the other player's word-phrase. The original player still receives his or her called out points for the word-phrase created. For example, using the letters A Z B L, a player announces seven syllables for the phrase "Aren't zebras beautiful looking?" Another player may challenge the syllable composition as containing eight syllables and will be awarded one point for the missed syllable.

Players are not penalized for creating an improper word-phrase. Players will simply not be awarded any points for the improper word-phrase. For example, a player forming an incoherent word-phrase sequence, a word-phrase that contains a proper noun, or a simple word starting with a letter not contained on the letter card will receive zero points for the entire word-phrase for that particular round.

Bonus points are possible for players receiving a vowel card 10, i.e., bonus card. If a player receiving a bonus card is able to use three of the four vowel letters within the time limit allowed the player will receive the word-phrase syllable points and five bonus points. If a player receiving a bonus card 10 is able to use all four vowel letters in the allotted time the player will receive the word-phrase syllable.points and ten bonus points. For example, a player receiving a card 10 bearing the indicia letters A A A A might form the phase, "Aren't alligators angry animals?" The player would be awarded ten points for the word-phrase syllables and ten bonus points for a total of twenty points for the round.

A round of game play ends when all players have had the opportunity to verbally communicate their word-phrase to the other players and points have been awarded according to the above outlined criteria. The object of the game play is to be the player with the highest number of points awarded or to be the first player to reach a designated point value. A subsequent round may begin after a second dealer is chosen and the deck of cards 10 is shuffled. Play is continued in this fashion until a desired number of rounds have been played.

While the invention has been described in connection with what is presently considered to be the most practical and preferred embodiment, it is to be understood by those skilled in the art that various changes and modifications may be found by those skilled which are within the spirit and scope of the invention.

We claim:

1. A method of playing a word game, comprising the steps of:
   providing a plurality of players,
   providing a plurality of cards each having a unique ordered set of letters of the alphabet imprinted thereon,
   providing a timing means for setting a predetermined time limit,
   providing one said player with score pad,
   all players simultaneously take a turn, comprising the steps of:
      distributing a single said card to each said plurality of players,
      viewing said unique set of letters on said card
      starting said timer,
      each player, as quickly as possible, creates a word beginning with each said unique ordered letter, each of said words created from said unique ordered letters when read together in the same order as on said card form a grammatical correct phrase,
      at the end of said predetermined time limit, players stop creating said word-phrase,
      player communicates said word-phrase to other players of said word game,
      player is awarded points for the total number of syllables contained in said word-phrase, and
      totaling the point values for each player, wherein the player with the most total points is declared the winner.

2. The word game of claim 1, wherein said communication between players is verbal.

3. The word game of claim 1, wherein said cards contain four unique ordered set of letters.

4. The word game of claim 1, wherein the timer expires after one minute.

5. The word game of claim 1, wherein the number of said turns for each player is predetermined.

6. The word game of claim 1, wherein proper nouns are excluded from said word-phrase.

7. The word game of claim 1, wherein said players can acquire additional points, comprising the steps of:
   identifying syllables unaccounted for in said word-phrase of another player, verbally communicating said unaccounted for syllables to the other players, and said verbally communicating player is awarded points for the total number of unaccounted for syllables contained in said word-phrase of another player.

8. A method of playing a game comprising the steps:
   providing a plurality of cards each bearing ordered letters thereon, wherein the plurality of cards comprise a first card;
   receiving a card from the plurality of cards including the first card;
   viewing the ordered letters on the first card;
   creating words representing each of the ordered letters on the first card, wherein the words, when read together in the same order as the ordered letters are on the first card, form a grammatically correct word-phrase;
   communicating the word-phrase; and
   awarding points for a total number of syllables stated to be contained in the word-phrase.

9. The game of claim 8, further comprising the step of providing a time limit for creating the words.

10. The game of claim 9, wherein the time limit is one minute.

11. The game of claim 8, wherein each of the plurality of cards bears four ordered letters.

12. The game of claim 8, wherein the communicating is verbal.

13. The game of claim 8, wherein the plurality of cards total fifty-seven in number.

14. The game of claim 13, wherein plurality of cards include five vowel cards.

15. The game of claim 8, wherein proper nouns are excluded from the word-phrase.

16. The game of claim 8, further comprising the steps of:
   recognizing missed syllables in the word-phrase;
   communicating the missed syllables; and
   awarding points for a total number of missed syllables stated to be in the word-phrase.

17. The game of claim 16, wherein the communicating is verbal.

* * * * *